(12) United States Patent
Rajamanickam et al.

(10) Patent No.: US 8,693,341 B2
(45) Date of Patent: Apr. 8, 2014

(54) METHOD AND APPARATUS FOR OPTIMIZING DATA TRAFFIC PATH THROUGH A STACKED SWITCH LAG CONFIGURATION

(75) Inventors: Muralikrishnan Rajamanickam, Chennai (IN); Sampathkumar Rajamanickam, Chennai (IN)

(73) Assignee: Force10 Networks, Inc., San Jose, CA (US)

( * ) Notice: Subject to any disclaimer, the term of this patent is extended or adjusted under 35 U.S.C. 154(b) by 207 days.

(21) Appl. No.: 13/157,381

(22) Filed: Jun. 10, 2011

(65) Prior Publication Data

US 2012/0314581 A1    Dec. 13, 2012

(51) Int. Cl.
*H04L 12/24* (2006.01)
(52) U.S. Cl.
USPC .......................................................... 370/238
(58) Field of Classification Search
USPC ......................... 370/253–340; 709/201–213
See application file for complete search history.

(56) References Cited

U.S. PATENT DOCUMENTS

| | | | |
|---|---|---|---|
| 8,243,594 B1 * | 8/2012 | Fotedar et al. | 370/229 |
| 2005/0073963 A1 * | 4/2005 | Goodfellow et al. | 370/255 |
| 2006/0133282 A1 * | 6/2006 | Ramasamy | 370/238 |
| 2011/0299391 A1 * | 12/2011 | Vobbilisetty et al. | 370/230.1 |
| 2012/0236859 A1 * | 9/2012 | Subramanian et al. | 370/392 |

* cited by examiner

*Primary Examiner* — Ayaz Sheikh
*Assistant Examiner* — Debebe Asefa
(74) *Attorney, Agent, or Firm* — Haynes and Boone, LLP (57) ABSTRACT

A stacked switch includes two or more individual network switches connected to each other in a ring or daisy chain topology over stacking links, and at least one port on two or more of the individual switches comprising the stacked switch is a member of a LAG configured on the stacked switch. Each of the individual switches comprising the stacked switch include control plane and data plane functionality that operates to maintain switching tables and to process network data ingressing to the switch to determine how to forward the network data through the switch to an egress point. The control functionality included in each of the switches comprising the stacked switch also includes an enhanced ECMP functionality that operates to optimize the use of stacking link bandwidth on the stacking links connecting the two or more individual switches to each other.

19 Claims, 10 Drawing Sheets

FIG. 1

STACKED SWITCH 100

FIG. 4A  RELATIVE COST TABLES 213 – RING TOPOLOGY

FIG. 4B  RELATIVE COST TABLES 213 – DAISY-CHAIN

TABLE 410

RELATIVE COST FROM SW 301

| SW ID | REL COST |
|-------|----------|
| 301   | 0        |
| 302   | 1        |
| 303   | 2        |
| 304   | 5        |
| 305   | 4        |
| 306   | 3        |
| 307   | 2        |
| 308   | 1        |

TABLE 411

RELATIVE COST FROM SW 302

| SW ID | REL COST |
|-------|----------|
| 301   | 1        |
| 302   | 0        |
| 303   | 1        |
| 304   | 6        |
| 305   | 5        |
| 306   | 4        |
| 307   | 3        |
| 308   | 2        |

TABLE 418

RELATIVE COST FROM SW 308

| SW ID | REL COST |
|-------|----------|
| 301   | 1        |
| 302   | 2        |
| 303   | 3        |
| 304   | 4        |
| 305   | 3        |
| 306   | 2        |
| 307   | 1        |
| 308   | 0        |

FIG. 5A

REDUCED COST TABLE 500 - RING

| REL COST FROM Tx PORT (rcTx) HASH CALC. (1ST COL.) | MIN. COST EQUATION MAX COST (MC) = 4 (2ND COL.) | REDUCED REL. COST (3RD COL.) |
|---|---|---|
| 4 | rcTx − (MC−0) | 0 |
| 3 | rcTx − (MC−2) | 1 |
| 2 | rcTx | 2 |
| 1 | rcTx | 1 |
| 0 | rcTx | 0 |

FIG. 5B

REDUCED COST TABLE 501 – DAISY-CHAIN

| REL COST FROM Tx PORT (rcTx) HASH CALC. (1ST COL.) | MIN. COST EQUATION MAX COST (MC) = 4 (2ND COL.) | REDUCED REL. COST (3RD COL.) |
|---|---|---|
| 7 | rcTx – (MC-0) | 0 |
| 6 | rcTx – (MC-2) | 1 |
| 5 | rcTx – (mc-4) | 2 |
| 4 | rcTx – (MC-6) | 3 |
| 3 | rcTx | 3 |
| 2 | rcTx | 2 |
| 1 | rcTx | 1 |
| 0 | rcTx | 0 |

METHOD AND APPARATUS FOR OPTIMIZING DATA TRAFFIC PATH THROUGH A STACKED SWITCH LAG CONFIGURATION

BACKGROUND

1. Field of the Invention

The present disclosure relates generally to packet network devices such as switches that are configured in a stacked relationship to each other and which are configured to support a link aggregation group. This disclosure relates more particularly to methods for selecting a egress port to use for network traffic switched through the stacked switch over the link aggregation group.

2. Description of Related Art

Single chassis packet switches can only support a limited number of line cards and ports. Some vendors provide special link cards or "back-end" ports that can be used to connect or stack two or more separate switches together to form a stacked system that in at least some ways acts with peer devices like a single larger chassis. U.S. patent application Ser. No. 12/828,514 entitled "Multiple Chassis Stacking using Front-End Ports" which was filed Jul. 1, 2010 and assigned to Force 10 Networks, Inc. describes a method and apparatus for creating a single, logical chassis out of two or more physical chassis, linked through their front-end traffic ports. A stacking link with enough member ports to support anticipated cross-platform traffic is set up between the two or more chassis, and route processing managers on the two or more chassis negotiate to determine a stack master. The stack master configures line cards on each chassis for appropriate behavior in each traffic situation, as is described in the application. Such behavior generally uses the same types of lookup and forwarding operations employed in a single-chassis operation, but with instructions that vary, sometimes per line card, depending on the ingress and egress chassis of a packet. One motivation for connecting two or more network switches in a stacked switch configuration can be to increase the number of ports that can be controlled by a single management/control plane. From the perspective of the packet network, the stacked switches operate as a single, logical switch.

Link aggregation refers to a process for operating a group of physical links as if they were a single link. At least one standard for link aggregation has been promulgated by the Institute of Electrical and Electronic Engineers, e.g., in the IEEE 802.1AX-2008 standard, incorporated herein by reference. There are a number of motivations for implementing Link Aggregation on network switches, one of which is to increase link bandwidth by combining the capacity of multiple physical links together into one logical link.

Figure 1:
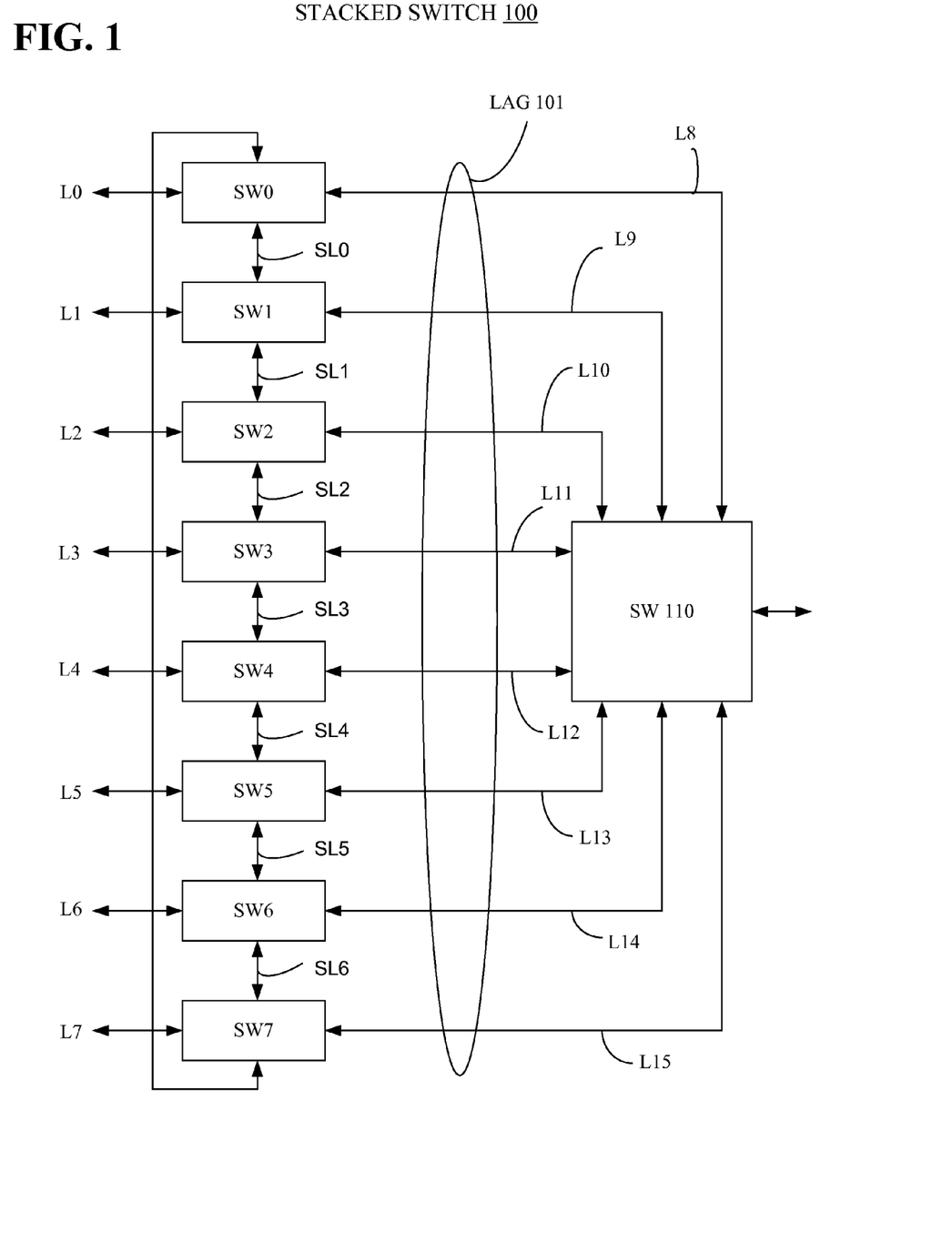
FIG. 1 is a diagram showing a portion of a packet network that includes a stacked switch and a single switch.

FIG. 1 is a diagram showing eight network switches, SW0-SW7, configured in a stacked relationship to each other to form a single stacked switch 100. Depending upon the stacking configuration, each one of the eight switches can be connected to one or more other of the switches by a stacking link (SL0-SL7). If the switches comprising the stacked switch 100 are configured in a daisy-chain topology, then all but two of the switches comprising the stacked switch SWn are connected by single stacking links to two other switches. The remaining two switches are only connected by a single stacking link to one other switch. On the other hand, if the switches comprising the stacked switch 100 are configured in a ring topology, then each of the switches in the stacked switch 100 are connected by stacking links to two other switches comprising the stacked switch 100.

The stacked switch 100 in FIG. 1 can be configured to support one or more link aggregation groups (LAG) such as LAG 101. The LAG 101 includes eight member ports, with there being only one member port of the LAG residing on each switch SW0-SW7 comprising the stacked switch 100. Each of the LAG member ports on the switches SW0-SW7 are connected to a single switch 110 over links L8-L15. In operation, data in the form of a frame of information can ingress to any one of the switches comprising the stacked switch 100, be processed by the switch and egress from the same switch as it arrived on or on a different switch over the LAG 101 to the switch 110. Assuming that each of the paths between the stacked switch 100 and the single switch 110 are equal cost paths, then any member port on any one of the stacked switches SW0-SW7 can be selected as the port on which the data egresses the stacked switch. Equal cost multipath (ECMP) routing techniques are well known that employ various hash algorithms to select egress ports over which to forward the data.

A hash algorithm operating in conjunction with the ECMP routing technique calculates how to forward data ingressing to the stacked switch 100 over the LAG 101 such that the data is evenly distributed for transmission over each of the member ports of the LAG 101. In a stacked switch configuration, such as the switch 101, this can result in the sub-optimal use of stacking link bandwidth. For example, in the case where data ingresses to switch 1 of the stacked switch 100, and is scheduled to egress the stacked switch over a port on switch 5 (SW5), this data crosses four stacking links, SL1, SL2, SL3 and SL4. Typically, data ingressing to other switches comprising the stacked switch 100 can be scheduled for transmission over these same stacking links. Depending upon the bandwidth limitations of these stacking links, it is possible that the links can be overwhelmed by the network traffic flowing through the stacking switch 100, which can result in some of the data being dropped.

Summary: In light of the forgoing limitations to the bandwidth available on stacking links connecting two or more switches in a stacked switch configuration, it would be beneficial to distribute data ingressing to any of the switches comprising the stacking switch to LAG port members in a manner that optimizes the available stacking link bandwidth. In one embodiment, the bandwidth limitations imposed by stacking links on a stacked switch comprised of two or more individual switches connected to each in a ring or daisy chain topology are mitigated in a method that includes compiling a list of values associated with the relative cost to forward network data through a stacked switch, calculating a hash value on network data received at a stacked switch for egress over a link aggregation group configured on the stacked switch and using these values to identify a switch comprising the stacked switch over which to the network data egresses, and if the calculated hash value is greater than a minimum compiled relative cost value, calculating one or more reduced relative cost values, and transmitting the network data over an egress port that is associated with one of the reduced relative cost values if the egress port is a member or the link aggregation group.

DETAILED DESCRIPTION

As described earlier in the background section, stacking links comprising a stacked switch with relatively low available bandwidth can be overwhelmed by network data flowing through a stacked switch. It was discovered, that it is possible to reduce/control the amount of traffic/data transmitted over the stacking links by limiting the number of stacking links that the traffic/data crosses from an ingress port to an egress port on the stacked switch. In one embodiment, an enhanced equal cost multipath (ECMP) routing technique is employed by each of the network switches comprising a stacked switch to reduce the number of stacking links that data ingressing to the stacked switch crosses before egressing from the switch. An embodiment of an enhanced ECMP routing technique is described with reference to FIG. 2.

Figure 2:
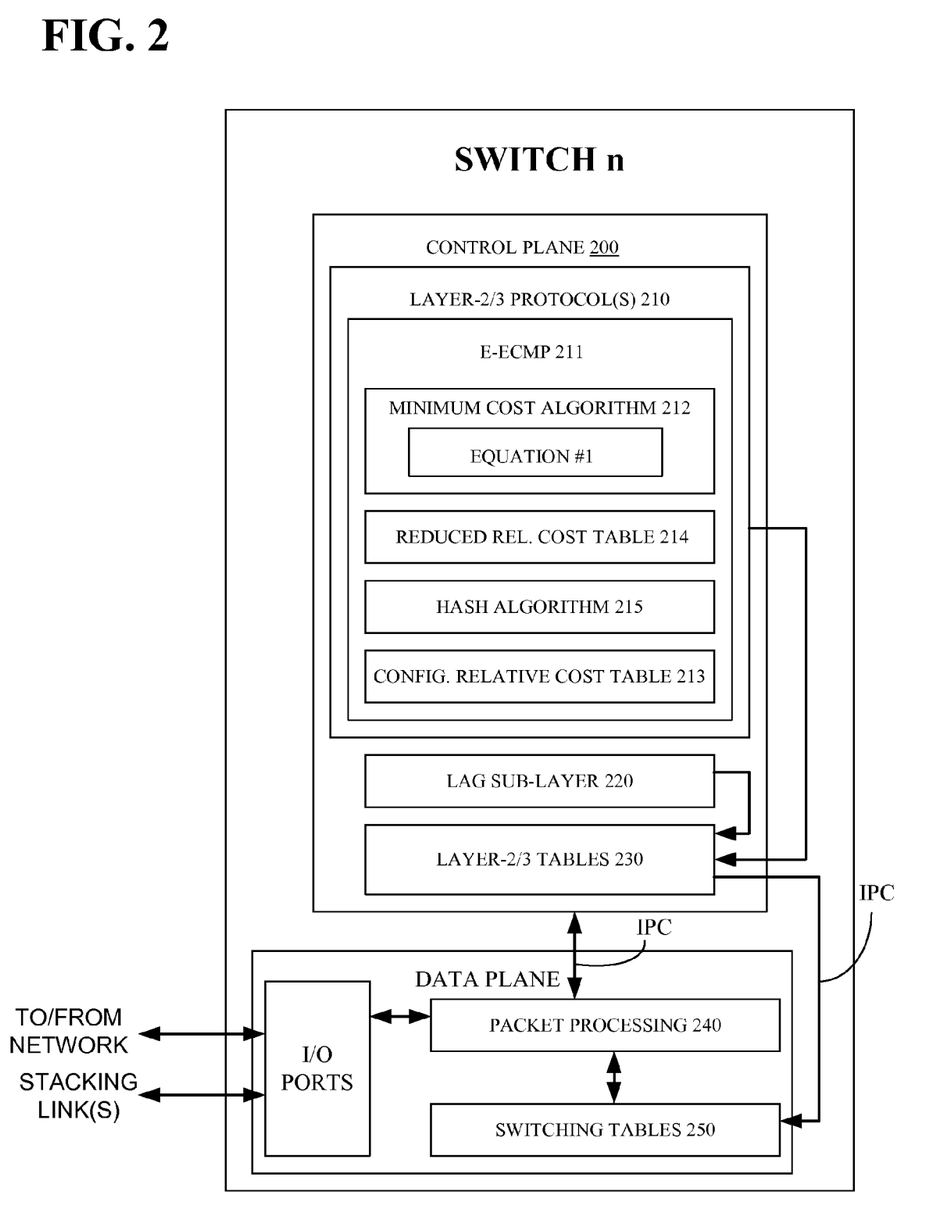
FIG. 2 is block diagram showing functionality comprising a network switch.

FIG. 2 is a block diagram showing functionality comprising a network switch (SWn) that includes the enhanced ECMP routing technique described above. Network switch SWn can be comprised of hardware and software means for implementing a control plane 200 and a data plane 201. The control plane in this case is primarily responsible for running layer-2/3 network protocols, building and maintaining information stored in tables that can be employed by the switch to forward network data such as frames or packets of information, and the control plane is responsible for general switch control and maintenance functionality and is typically implemented on one or more control cards comprising the stacked switch SWn. The data plane is primarily responsible for processing the network data/traffic ingres sing to the switch, processing information included in the traffic to determine which next hop it should be forwarded to and then forwarding the traffic to the next hop in the network. The data plane functionality is typically implemented on one or more line cards comprising a stacked switch, such as the stacked switch SWn. Alternatively, one switch in the stacked switch 100 of Figure one can be designated the management or master switch. In this case, the management switch can include the control plane 200 functionality, but the control plane functionality can be absent from the remainder of the switches in the stacked switch 100.

More specifically with reference to FIG. 2, the control plane 200 can be comprised of hardware and software means (control processor, one or more route processors, memory) to implement layer-2/3 protocols, such as the well known Point-to-Point or OSPF protocols for example, to implement well known link aggregation sub-layer functionality 220, and the control plane 200 includes storage for information comprising one or more a tables. The network protocols, aggregation functionality, and the construction and maintenance of the tables are well understood by practitioners and so no detailed description of these will be offered here. The network protocol functionality 210 operates in conjunction with an enhanced ECMP (E-ECMP) routing technique 211 to determine to which of two or more equal or unequal cost paths network traffic should be forwarded, and to reduce the number of stacking links the network traffic crosses. More specifically, the E-ECMP 221 runs a hash function 215 the results of which are used to determine which of a plurality of equal cost paths over which to forward network traffic. Also, a relative cost table 213 is constructed which includes the relative distances or costs from each switch SW301-308 comprising the stacked switch 300 to each other switch comprising the stacked switch. As with the network protocols and the other functionality described that comprises the control plane 200, the ECMP routing technique is well understood by practitioners and so will not be described here in any detail. In one embodiment, the enhanced ECMP technique 211 operates to run a minimum cost algorithm 212 that calculates a reduced relative cost. Relative cost in this context is equivalent to the number of stacking links network data ingressing to SWn crosses before egressing the stacked switch. The relative cost calculated by algorithm 212 is stored in a table 214, and this cost information is used by the control plane 200 to build and maintain the tables 230. The operation of the minimum cost algorithm 212 to calculate the reduced relative cost and the construction of a table to store this information is described later with reference to Equation No. 1 and FIGS. 5A and 5B. The enhanced EMCP technique 211 also uses the relative cost information stored in a table 213 to determine whether a hash on the network traffic results in the lowest cost path through the stacked switch. The construction and use of table 213 is described later with reference to FIGS. 4A and 4B.

Continuing to refer to FIG. 2, the data plane 201 is generally comprised of hardware and software to implement a plurality of input/output ports 260, packet processing 240 and switching tables 250. Typically all of this functionality is included on one or more line cards comprising the network switch SWn. In general, the plurality of I/O ports 260 operate to receive and/or transmit network data, such as packets or frames of network information, the packet processing functionality 240 operates to, among other things, examine information included in packets or frames ingres sing to the switch SWn and use this information to determine which egress port the packet or frame is forwarded to. Table(s) 250 generally store information that the packet processing functionality uses to determine how to forward packets ingressing to the switch. These tables are generally maintained by control plane clients running on the line card. The plurality of I/O ports 260 can be implemented in a network interface device, the packet processing functionality 240 can be implemented in a packet processor device and the switching table 250 can be stored in a memory device. Although the control plane and data plane functionality are described above as being implemented in separate physical modules, they need not be, and both functions can be implemented in a single physical module or unit. The operation of the E-ECMP 211 will now be described in conjunction with FIG. 3.

Figure 3:
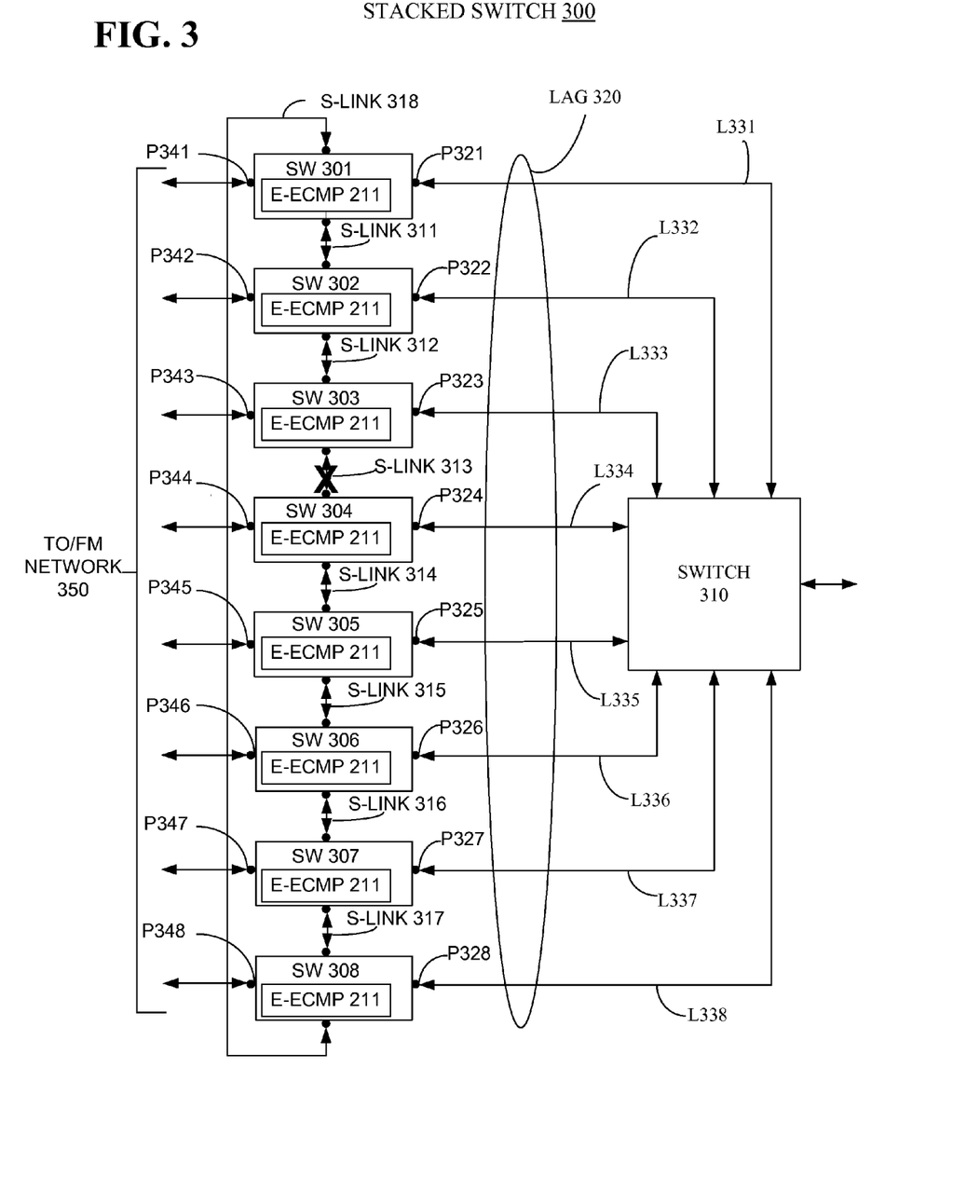
FIG. 3 is a diagram showing a portion of a packet network that includes a stacked switch and a single switch according to an embodiment.

FIG. 3 is a diagram of a stacked switch 300 shown to be connected to a network 350 and to a network switch 310. The stacked switch 300 is comprised of eight network switches SW301-SW308. Each one of the switches SW301-308 comprising the stacked switch 300 is in communication with two others of the switches SW301-308 comprising the switch 300 over stacking links. For example, switch 301 is connected to switches 302 and 308 respectively over stacking links (s-link) 311 and 318, switch 302 is connected to both switches 301 and 303 respectively over stack links 311 and 312 and so forth. The stacked switch 300 of FIG. 3 is shown to be configured in a ring topology, although it can be configured in daisy-chain topology as well. In a ring topology, each of the switches SW301-308 comprising the stacked switch 300 is connected over a stacking link to two other switches comprising the stacked switch. Alternatively, the switches SW301-308 comprising the stacked switch 300 can be configured in a daisy-chain topology, in which all of the switches are connected to two other switches except that one of the switches SW301-308 comprising the stacked switch is connected by a stacking link to only one other of the switches SW301-308. The stacked switch 300 of FIG. 3 can, as the result of a stacking link failure, dynamically change from a ring topology to a daisy-chain topology. So for example, if s-link 313 fails (illustrated in FIG. 3 by an "X" on the s-link 313), then the topology of the stacked switch 300 changes from a ring to a daisy-chain topology. It should be understood that the stacked switch 300 can include more or fewer separate switches than the eight shown in FIG. 3, but eight are shown here for the purpose of this description.

Continuing to refer to FIG. 3, one or more ports on each of the separate switches, SW301-SW308, can be configured to be a member of a link aggregation group (LAG) 320. In this case, the ports which are members of LAG 320 are labeled as ports P321 to P328 and each of these ports are connected to network switch 310 over links L331 to L338. The stacked switch 300 also includes ports P341 to P348 that operate to respectively receive/transmit data (packets/frame of information) from/to a network 350. The switch 310 recognizes the stacked switch 300 as a single, logical switch and the LAG 320 as a single logical link connecting it to the stacked switch 300. In operation, a packet or frame of information ingressing to the stacked switch 300 from the network 350 on any one of the ports P341-P348 can be processed by the receiving switch which determines that the packet DA is associated with a port on that switch, or the packet can be processed by the receiving switch which determines that the packet DA is associated with a port located on another switch, in which case the packet is transmitted over one or more stacking links and egresses the stacked switch 300 on a port located on any one of the other switches SW301-308 comprising the stacked switch. Assuming that it is determined that a packet ingressing to the stacked switch 300 is destined for switch 310 over LAG 320, and that each of the links 331-338 are equal cost paths, standard ECMP functionality recognizes that the packet can be forwarded to switch 310 over any one of eight ports, P321-P328. Specifically, the hash algorithm 215 described with reference to FIG. 2 and running in conjunction with the E-ECMP functionality 211 on each switch SW301-308 can calculate on which of the eight ports P331-338 the packet should egress the stacked switch 300. So, in the case of the stacked switch 300 of FIG. 3, the packet can egress the switch 300 on any one of the ports, P321-P328. As was discussed in the background section, using standard ECMP routing functionality to calculate an egress port in a stacked switch can lead to the sub-optimal use of stacking link bandwidth. In one embodiment, the minimum cost algorithm 212 is used to reduce the cost associated with forwarding network data through a stacked switch, such as the stacked switch 300 of FIG. 3. Cost in the context of this embodiment can be distance metric representing the number of stacking links that the network data crosses from the port in which it ingresses to the port on which it egresses the stacked switch 300. Depending upon how the minimum cost algorithm 212 is configured, the relative cost to forward network data through a stacked switch can be controlled/calculated to be a larger or smaller value. The extent to which the calculated relative cost is minimized can depend on a number of factors, such as the total number of ports in the stacked switch and the total number of ports in the stacked switch that can be configured to be a LAG member for instance. This control over the cost of forwarding network data through a stacked switch can be accomplished by an enhanced ECMP routing function, such as the E-ECMP 211 of FIG. 2, which operates on network data ingres sing to a stacked switch, such as switch 300 of FIG. 3, to modify the distribution of the network data over a LAG such that the data crosses a minimum number of links before egressing the stacked switch. More specifically, relative cost information relating to the distance from one of the switches, SW 301-SW 308, comprising the stacked switch 300 to each of the other switches is stored/maintained in relative cost tables 214 stored in association with the E-ECMP routing function 211. The format and construction of the relative cost tables 213 will now be described with reference to FIG. 4.

Figure 4A:
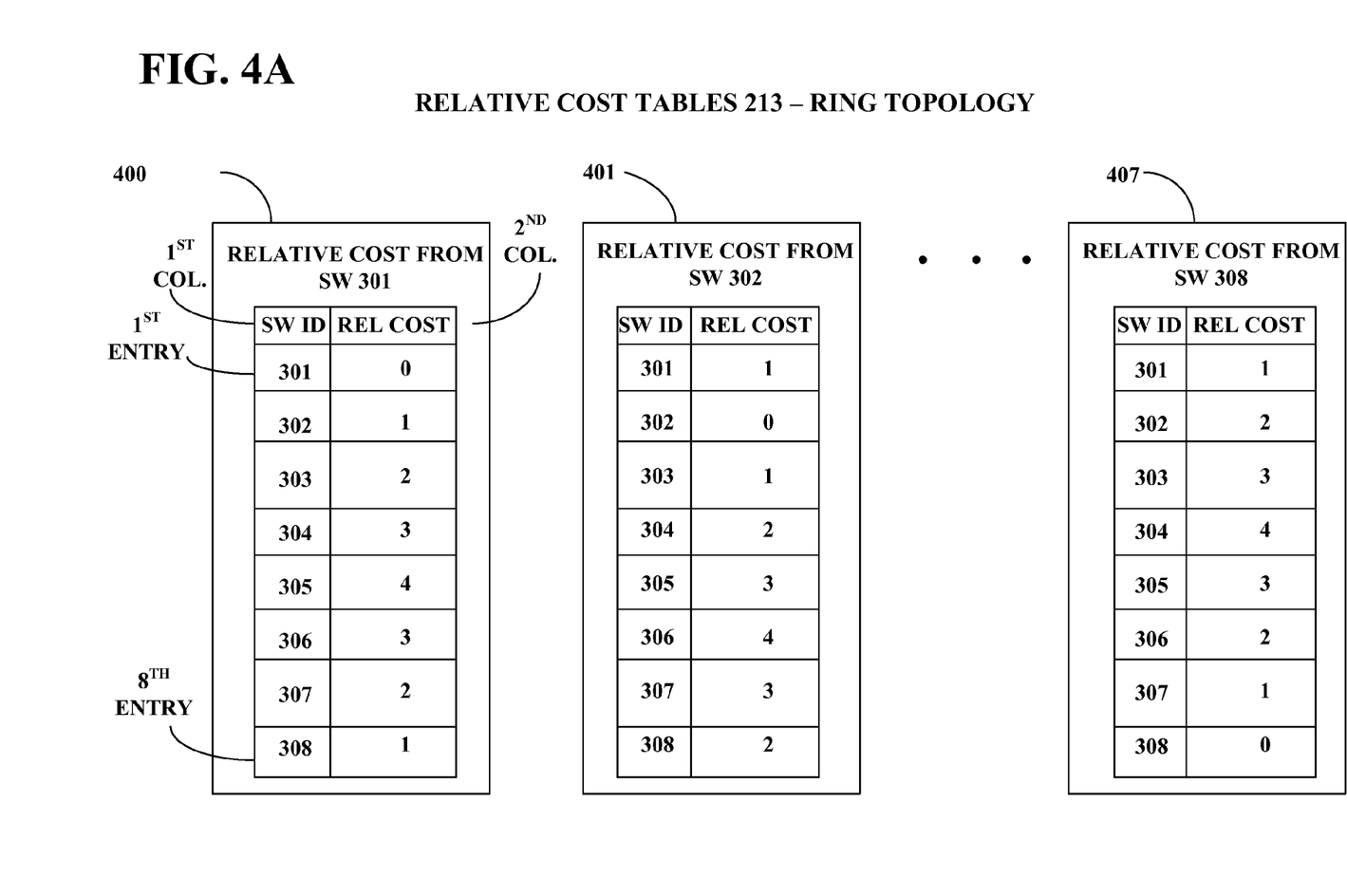
FIG. 4A is an illustration of relative cost tables for a stacked switch configured in a ring topology.

FIG. 4A illustrates the format and contents of relative cost tables for a stacked switch, comprising eight switches configured in a ring topology, that can be built based upon the configuration of the stacked switch 300 of FIG. 3. The contents stored in the tables can be generated manually by a systems administrator or it can be generated automatically using some routine running on the stacked switch. For the purpose of this description, FIG. 4 illustrates only three of the eight (in this case) tables that are stored in each of the switches SW 301-308 comprising the stacked switch 300. Table 400 includes information that is representative of the distance or relative cost from switch SW 301 to each of the switches comprising the stacked switch 300, and is formatted to include two columns, with a first column for storing the identity of each of the switches SW 301-308 and a second column for storing the relative costs corresponding to each switch identity. So for example, the first entry in the first column of table 400 includes the identity of SW 301 and the first entry in the second column includes the value of the relative cost from switch SW 301 to the same switch, which is of course zero ("0"). The second entry in the first column includes the identity of SW 302 and the second entry in the second column includes the value of the relative cost from switch SW 301 to SW 302 which in this case is two ("2"), and so forth to the last or eighth entry which includes the identity of SW 308. Each of the remaining tables 401 and 407 illustrated in FIG. 4A include relative cost information from the perspective of switches SW 302 and SW 308 respectively. In normal operation using a standard ECMP routing technique, network data ingressing to switch SW 301 for distribution over the LAG 320 can be selectively transmitted out over any one of the switches SW 301-308. In the event that port 322 on SW 302 is selected as the egress port for the data, then the cost associated with propagating the data through the stacked switch is "1", which is the relative cost value included in the second entry in the second column of table 400 of FIG. 4A.

Figure 4B:
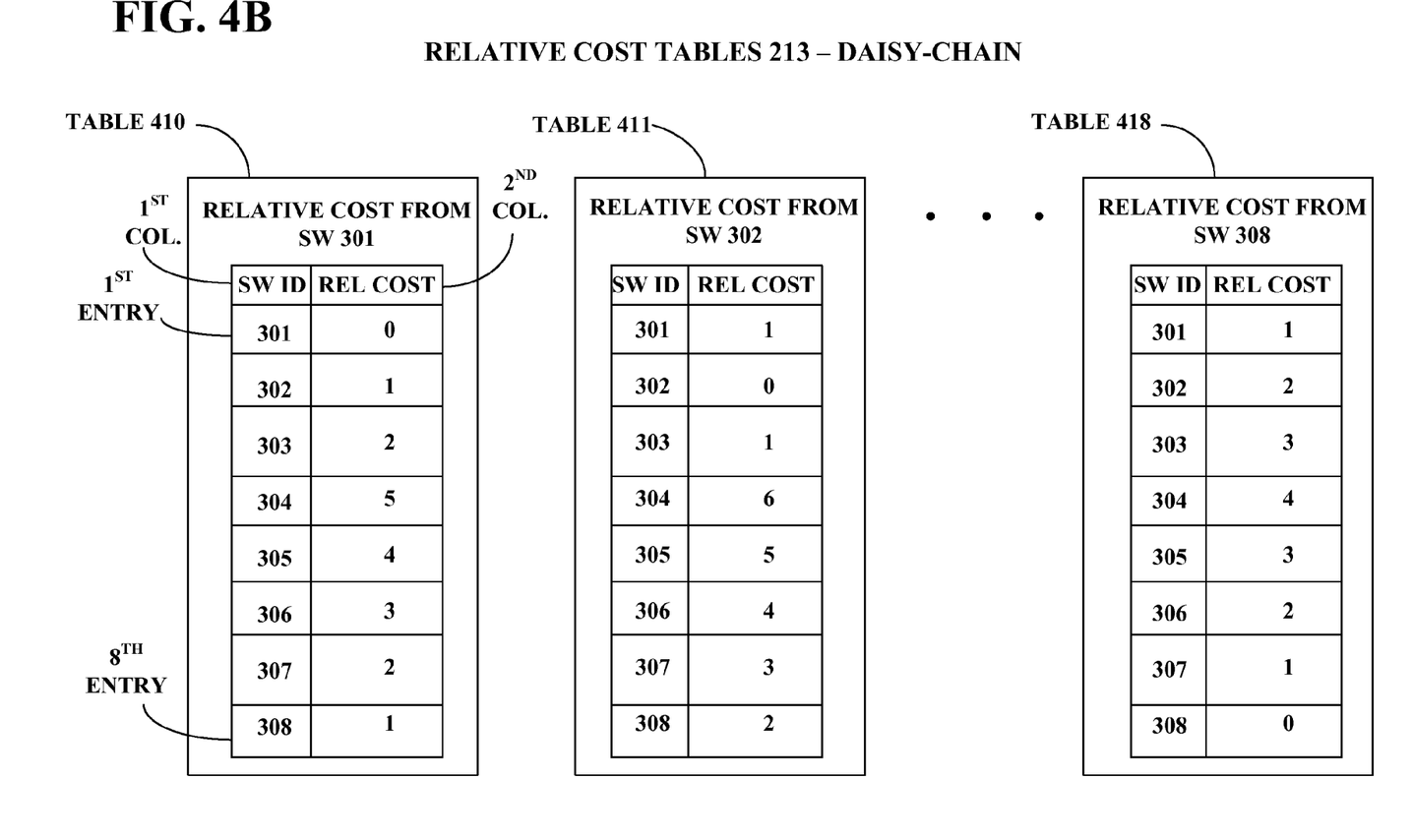
FIG. 4B is an illustration of relative cost tables for a stacked switch configured in a daisy-chain topology.

FIG. 4B illustrates the format and contents of relative cost tables for a stacked switch, comprising eight switches configured in a daisy-chain topology, that can be built based upon the configuration of the stacked switch 300 of FIG. 3. These tables are build under the assumption that the S-Link 313 has failed, which is the link between SW303 and SW304. The contents of the tables can be generated manually by a systems administrator or the contents can be generated automatically using some routine running on the stacked switch. For the purpose of this description, FIG. 4B illustrates only three of the eight (in this case) tables that are stored in each of the switches SW 301-308 comprising the stacked switch 300, and it is assumed that the stacking link between switches SW 303 and 304 is down. Table 410 includes information that is representative of the distance or relative cost from switch SW 301 to each of the switches comprising the stacked switch 300, and is formatted to include two columns with a first column for storing the identity of each of the switches SW 301-308 and a second column for storing the relative costs corresponding to each switch identity. Table 411 is similar to Table 410 except that the relative cost information included in the table is generated based upon the distance from switch 302 to the other switches comprising the stacked switch 300. It is noted that while the distance from switch SW 302 to SW 304 is "2", the distance from SW 302 to SW 305 is "5". This is due to the stacking link between SW 303 and SW 304 being down. The relative cost information included in the tables 401-407 and 410-418 described above with respective reference to FIGS. 4A and 4B is used as a reference value against a value calculated by a hash algorithm. More specifically, if the calculated hash value maps to a port that is on a switch, comprising the stacked switch 300, that is different than the switch to which network data ingresses (i.e., is equivalent to a distance/cost that is greater than the minimum cost stored in a corresponding relative cost table), then a reduced relative cost value can be calculated using the minimum cost algorithm 212 described earlier with reference to FIG. 2. Alternatively, a reduced relative cost value may be calculated if the number of stacking links the network data crosses from the ingress switch to the egress switch is greater than a selected minimum relative cost, the selected minimum relative cost being greater than zero and less than or equal to the maximum cost associated with forwarding network data through a stacked switch. If any of the above conditions are met (i.e., the hash value maps to an egress port that results in greater than a minimum cost, as compared to the cost values in the relative cost tables, to forward the data through a stacked switch), then a reduced relative cost value can be calculated using Equation 1 described below.

Reduced Relative Cost=(Hash Cost)−[(Max Cost)−$X$]    Equation 1:

The first term in Equation 1 is the relative cost value calculated by the hash on the network data ingressing to a switch. Depending upon the stacked switch topology, this cost value calculated by the hash function will not exceed a relative cost value stored in a table of relative costs, such as either one of the Tables 4A and 4b. The second term in Equation 1 is the difference between a maximum cost value and a variable "X". The maximum cost value is a maximum cost value stored in a relative cost table (Table 4A or 4B) that corresponds to the switch on which the network data ingresses, and the variable "X" can be an integer value of between zero and N in increments of two, inclusive of zero.

If the predetermined conditions for calculating a reduced minimum cost are met, then an instance of Equation 1 on a switch to which network data ingresses is invoked by the minimum cost algorithm 212 described earlier with reference to FIG. 2, and Equation 1 is evaluated against each hash calculated cost value until the term "(max cost)−X" is equal to zero or 1 (not including zero or one). So for example, if a hash function calculates a cost value equal to four (4) for data ingressing on a switch comprising a stacked switch, and if the maximum relative cost to forward the data through the stacked switch is equal to four (4), then the value for the variable "X" is equal to four (4) the first time Equation 1 is evaluated. The second time Equation 1 is evaluated, the value of "X" is equal to two (2), and so forth until the value of the term "(max cost)−X" becomes one or zero (not inclusive of one or zero). The reduced relative cost value information calculated by Equation 1 is entered into a reduced cost table, and this information is used by the E-ECMP to distribute the network data over ports that are members of a LAG, such as the LAG 320 of FIG. 3, when a condition for invoking the minimum cost algorithm 212 is met (i.e., the cost value calculated by a hash function is greater than a predetermined minimum relative cost value stored in a relative cost table, such as the tables described with reference to FIGS. 4A and 4B).

Figure 5A:
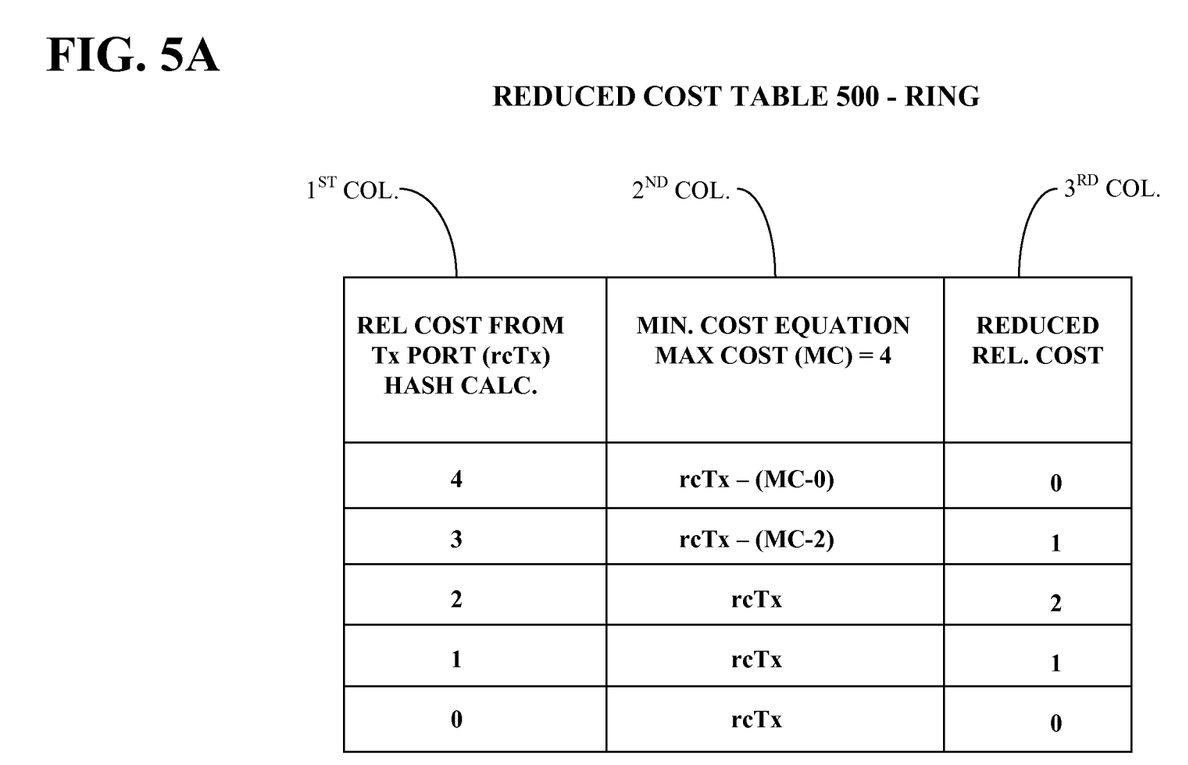
FIG. 5A is a table showing information used to calculate a new relative cost for a stacked switch configured in a ring topology.
Figure 5B:
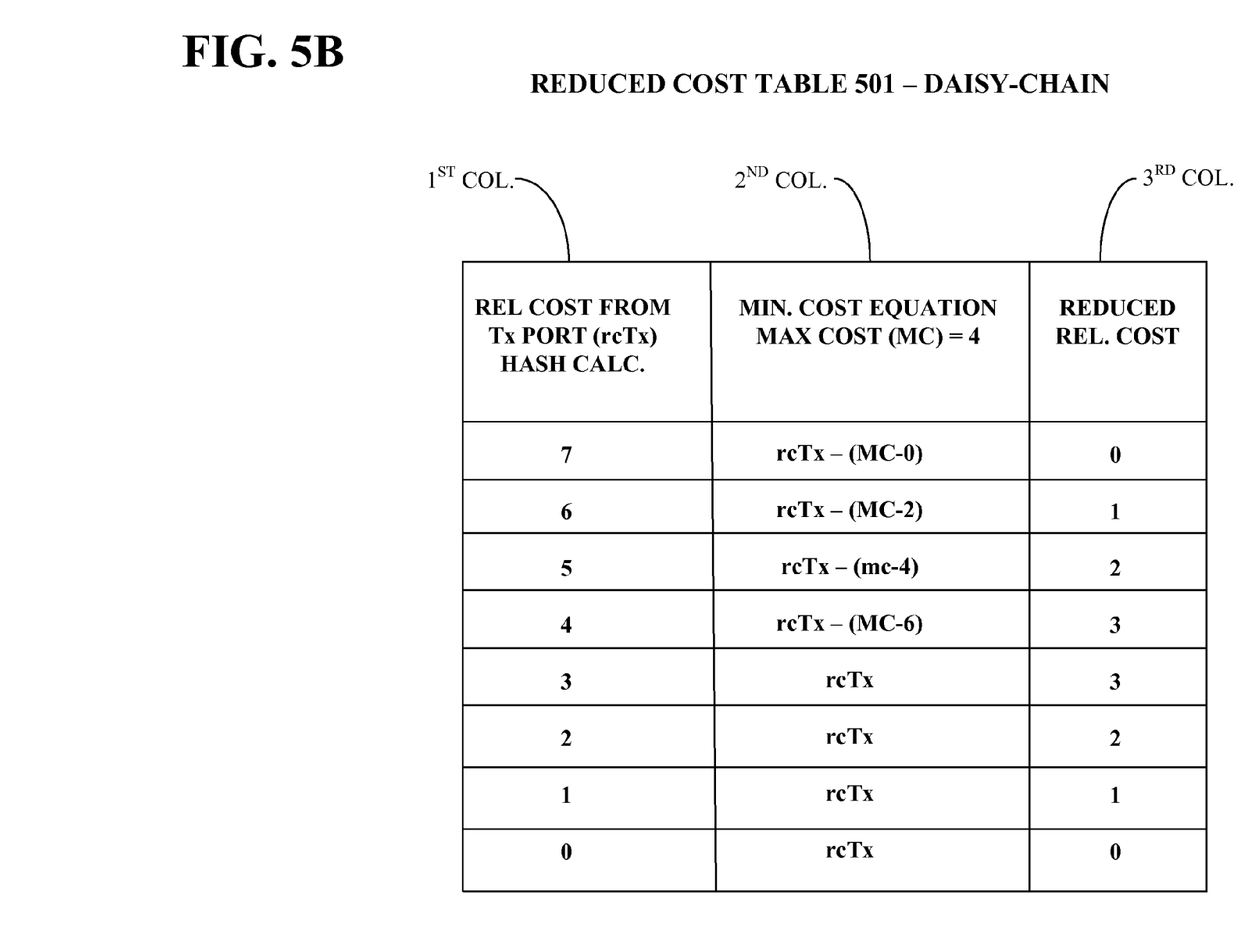
FIG. 5B is a table showing information used to calculate a new relative cost for a stacked switch configured in a daisy-chain topology.

FIGS. 5A and 5B illustrate the format and contents of two reduced cost tables 500 and 501 respectively. One instance of a reduced cost table is stored on each switch, SW 301-308 for instance, comprising a stacked switch such as stacked switch 300. Table 500 includes reduced cost values calculated for a stacked switch, such as switch 300, configured in a ring topology, and Table 501 includes reduced cost values calculated for a stacked switch configured in a daisy-chain topology.

Table 500 in FIG. 5A is configured with three columns, column 1, column 2 and column 3. Column 1 includes the relative costs, in descending order from largest to smallest cost, calculated by a hash function on network data ingressing to any one of the switches, SW 301-308, comprising the stacked switch 300. In this case the largest relative cost calculated by the hash function is four (4) and the smallest relative cost is zero (0). Column 2 includes the configuration for the Equation 1 that is used to reduce the corresponding relative cost included in column 1, and column 3 includes the reduced relative cost value resulting from the operation of Equation 1 in column 2. As illustrated by the values of the reduced relative costs stored in column 3, Equation 1 is designed to reduce the relative cost to forward network data from an ingress point to an egress point in a stacked switch such that the relative cost is reduce by one-half. Depending upon how Equation 1 is configured, more or less reduction in the relative cost can be effected, but for the purpose of this description, Equation 1 is configured to reduce the cost by one-half. It should be understood that Table 500 entries are calculated using Equation 1 based upon a stacked switch configured in a ring topology, wherein the stacked switch is comprised of 8 switches, which can be for example the eight switches SW 301-308 comprising stacked switch 300.

Table 501 in FIG. 5B is configured in a manner similar as that of Table 500, except the entries in Table 501 are populated with calculations using Equation 1 based upon a stacked switch in a daisy-chain topology, wherein the stacked switch is comprised of eight switches.

As described above, the E-ECMP routing technique 211 can use reduced relative cost information calculated by the minimum cost algorithm 212 to distribute network data to member ports of a LAG in a stacked switch. Considering the configuration of stacked switch 300 of FIG. 3 (configured in a ring topology), each switch SW 301-308 comprising the stacked switch includes one port that is a member of the LAG 320. It should be understood, that each switch can include more than one port that is a member of the LAG, or some switches may not include any ports that are members of the LAG. In the event that a packet ingresses to switch SW 302, according to the relative cost table 401 of FIG. 4A, the maximum cost to propagate the packet through the stacked switch is four (4). Assuming that a hash of the packet results in the selection of an egress port on switch SW 306, the cost to propagate the packet through the stacked switch is four (4), which is greater than the minimum relative cost stored in table 401. This condition causes E-ECMP 211 to run the minimum cost algorithm 212 which calculates a reduced relative minimum cost to be two (2). In this case, two switches, SW 304 and SW 308 are equally distant from the ingress switch SW 306 with respect to relative cost, and so E-ECMP is not able to determine which of the two switches, SW 304 or SW 308, should be selected as the switch on which the packet should egress. If this is the case, E-ECMP can run a two step process. In the first step (step A), E-ECMP selects the switch with the lower switch ID. If the switch with the lower switch ID does not include a port that is a member of the LAG, then E-ECMP selects the switch with the larger switch ID, and if this switch does not include a port that is a member of the LAG, then E-ECMP can run the second step (Step B) of the process. In Step B, E-ECMP 211 can incrementally add or subtract cost to or from the reduced relative cost calculated by the algorithm 211 until an egress switch including a port that is a member of the LAG is identified. If incrementally adding or subtracting cost to the value calculated by the minimum cost algorithm does not result in a cost value that corresponds with a switch that includes a port that is a member of the LAG, then the cost value calculated by the Hash function 215 can be used.

The operation of the E-ECMP routing technique 211 to reduce the relative cost of forwarding network data through a stacked switch is now described with reference to the logical flow diagram of FIG. 6. It should be understood that a system administrator can over-ride the operation of the E-ECMP routing technique 211 at any time in order to modify the distribution of network data by the E-ECMP in order to balance the load on the ports that are members of a LAG. The systems administrator can manually configure a reduced relative cost table generated as the result of running the minimum cost algorithm to distribute the network data differently than it would otherwise be automatically distributed by the E-ECMP. In Step 1 of FIG. 6, a table of relative cost information is created. The information stored in the table represent the cost to forward network data in a stacked switch (the number of stacking links network data crosses from its ingress point to its egress point), such as the stacked switch described with reference to FIG. 3 is created. This table can be created manually by a network administrator or it can be calculated automatically by a routine running in conjunction with the E-ECMP routing technique 211. In Step 2, network data, such as a packet of frame of information, ingressing to the stacked switch that is required to egress the stacked switch over a LAG, such as the LAG 320 of FIG. 3, is processed by the E-ECMP 211 to determine on which of a plurality of switches comprising the stacked switch the network data will be scheduled for egress. Specifically, the hash algorithm 215 running in conjunction with the E-ECMP routing technique operates on information typically found in the header of a packet or frame to calculate a next hop (which in the case of a stacked switch can be the port from which the packet egresses the stacked switch). This next hop can be a port located on the switch to which the network data ingresses, or it can be located on any one of the other switches, such as SW 301-308 (exclusive of the ingress switch), comprising the stacked switch 300.

Figure 6A:
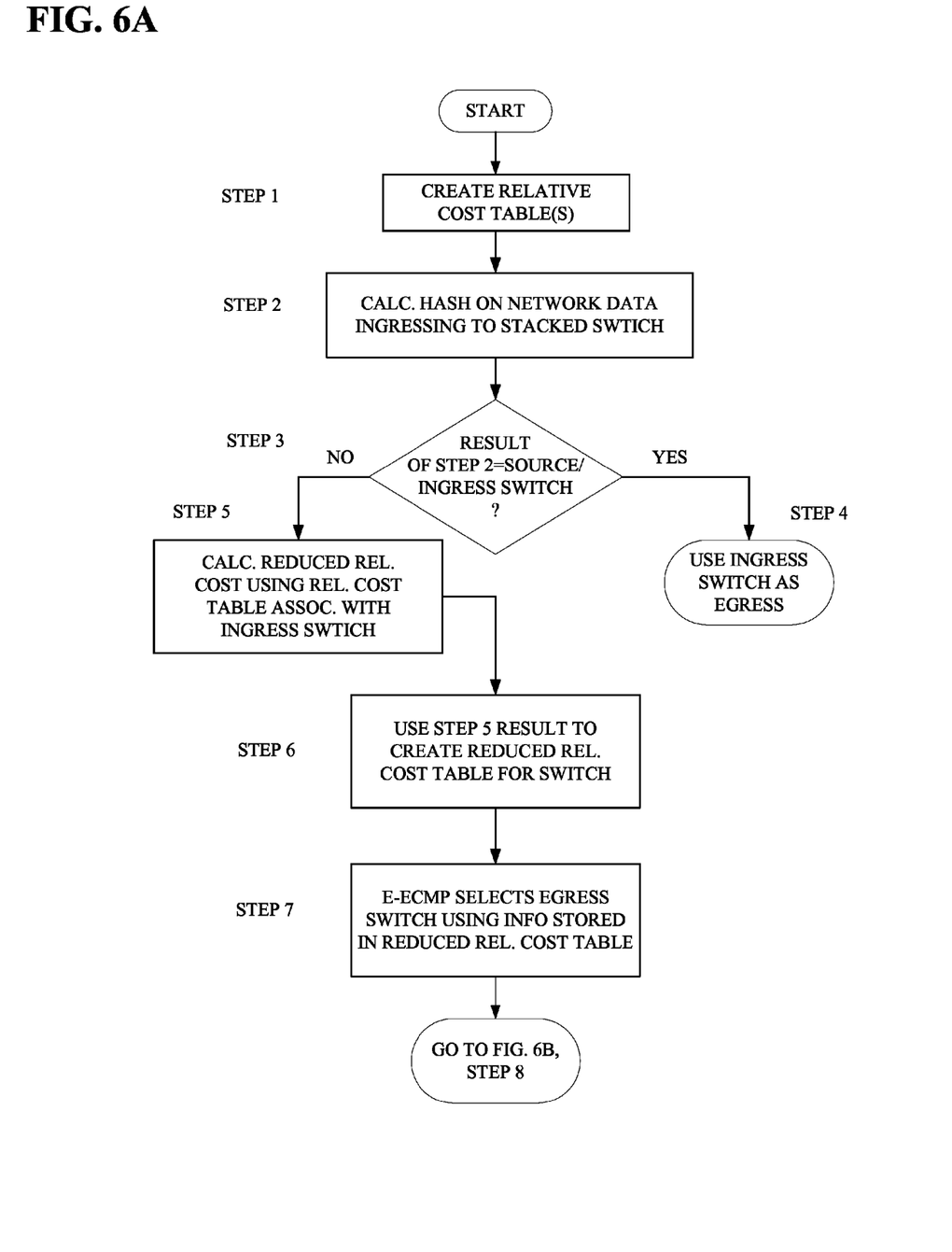
FIGS. 6A, 6B and 6C are a logical flow diagram of one embodiment.
Figure 6B:
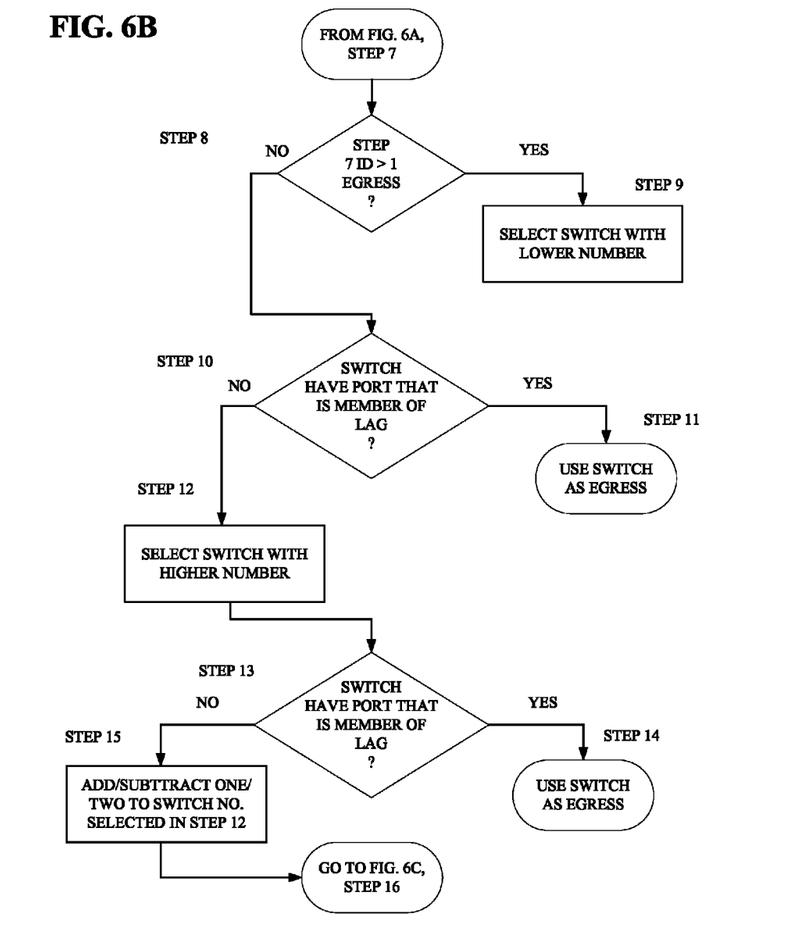
Figure 6C:
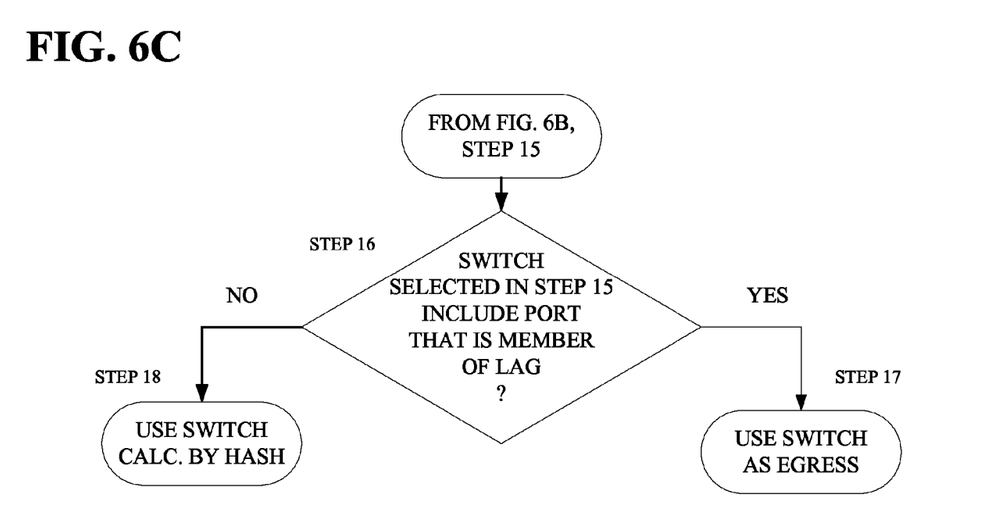

Continuing to refer to FIG. 6, in Step 3 a determination is made by the E-ECMP 211 whether or not the calculated hash value of the network packet maps to a LAG port that is located on the switch to which the packet ingresses. If the hash maps to the ingress switch, then in Step 4 this switch is selected as the egress switch for the packet. On the other hand, if the hash maps to a switch other than the switch to which the packet ingresses, then in Step 5 the E-ECMP routing technique 211 runs the minimum cost algorithm 212 to calculate a reduced relative cost using a stored relative cost table associated with the ingress switch, such as the relative cost table created in Step 1. So, for example, if the network packet ingresses to switch, SW 302, then the algorithm uses information stored in the relative cost table 401 described with reference to FIG. 4A to perform the reduced cost calculations. In Step 6, the results of the calculations of Step 5 are used to create a reduced relative cost table for the switch on which the packet ingresses and in Step 7, the E-ECMP routing routine 211 uses the cost information stored in the table created in Step 6 to select one of the switches comprising the stacked switch 300 to be the switch from which the network packet egresses. If, in Step 8, the E-ECMP 211 determines that Step 7 identifies more than one egress switch, then the process proceeds to Step 9 where the E-ECMP 211 selects the switch with the lower or lowest unit number. On the other hand, if in Step 8 only one switch is identified in Step 7, then the process proceeds to Step 10 where a determination is made whether or not the switch identified in either Step 7 or Step 9 includes a port that is a member of the LAG over which the network packet should egress the switch. If the switch does have a port that is a member of the LAG, then in Step 11 the E-ECMP routing routine 211 selects the switch references in Step 10 as the switch over which the network packet egresses. On the other hand, if Step 10 determines that the switch selected in Step 9 does not include a port that is a member of the LAG, then the E-ECMP routing routine 211 selects the switch with the higher or highest unit number and the process proceeds to Step 13. Step 13 includes the same logic as Step 10 to determine whether or not the switch selected in Step 12 includes a port that is a member of the LAG. If it does, then in Step 14 the switch selected in Step 12 is used as the egress switch, otherwise, the process proceeds to Step 15 where the unit number of the switch selected in Step 12 is incremented or decremented by one (alternatively, the unit number can be incremented or decremented by more than one) and in Step 16 a determination is made whether or not the switch selected in Step 15 includes a port that is a member of the LAG. If so, then the process proceeds to Step 17 and the switch selected in Step 15 is the egress switch, otherwise, the process proceeds to Step 18 where the results of the hash on the network packet performed in Step 2 are used to identify the egress switch and the packet is forwarded to this switch.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:
1. A method for forwarding network data through a stacked switch, comprising:
identifying a relative cost to forward network data from an ingress switch to each of a plurality of egress switches that are coupled together and to the ingress switch through stacking links, and storing the plurality of identified relative costs, wherein each identified relative cost represents a number of the stacking links over which network data ingressing to the ingress switch is for- warded before egressing the egress switch associated with that identified relative cost;

receiving network data on the ingress switch that includes the identity of a link aggregation group (LAG) associated with the stacked switch, performing a hashing operation on information included in the network data to calculate a next hop value that is associated with a first egress switch of the plurality of egress switches for forwarding the network data out of the stacked switch, wherein the first egress switch is associated with a first identified cost of the plurality of identified costs;

determining that the calculated next hop value maps to a LAG port that is not located on the ingress switch and, in response, calculating a reduced relative cost that corresponds to a second identified relative cost of the plurality of identified costs that is less than the first identified relative cost; and transmitting the network data over a second egress switch of the plurality of egress switches that is associated with the second identified relative cost if an egress port on the second egress switch is a member of the LAG.

2. The method of claim 1, wherein the performing the hash operation on information included in the network data to calculate the next hop value includes performing the hashing operation on information located in a header of a packet of the network data.

3. The method of claim 1, wherein the transmitting the network data over the second egress switch associated with the second identified relative cost results in the network data being forwarded over fewer stacking links relative to transmitting the network data over the first egress switch associated with the first identified relative cost.

4. The method of claim 1, wherein the reduced relative cost is calculated by subtracting a maximum value of the plurality of identified relative cost and a variable from the calculated next hop value.

5. The method of claim 4, wherein the variable is an integer between zero and N.

6. The method of claim 1, wherein the network data is transmitted on a third egress switch of the plurality of egress switches that is included in the stacked switch and that has a lower or a higher switch identity than the second egress switch if the second identified relative cost corresponds to the second egress switch and the third egress switch and the second egress switch does not include an egress port that is a member of the LAG.

7. The method of claim 6, wherein the lower or the higher switch identity is an assigned identity.

8. The method of claim 1, wherein the reduced relative cost is modified by incrementing or decrementing the reduced relative cost until an egress switch that includes an egress port that is a member of the LAG is identified.

9. The method of claim 1, wherein the calculated next hop value is used to identify an egress switch for forwarding the network data if no egress switches associated with the second identified relative cost include an egress port that is a member of the LAG.

10. A stacked switch, comprising:
a plurality of separate switches, each switch connected to at least one other switch over a stacking link and each of the switches including means for storing and running an enhanced equal cost multipath functionality that operates to minimize the number of stacking links over which network data associated with a link aggregation group (LAG) is forwarded after ingressing to the stacked switch and before egressing from the stacked switch, wherein the enhanced equal cost multipath functionality operates to calculate a relative cost associated with forwarding the network data through the stacked switch, compare the calculated relative cost with a stored previously identified relative cost, calculate a reduced relative cost in response to a hashing operation on the network data providing a next hop value that maps to a LAG port that is not located on the switch that received the network data, and transmit the network data over an egress switch included in the stacked switch that corresponds to the calculated reduced relative cost if an egress port on the egress switch is member of the LAG.

11. The stacked switch of claim 10, wherein the enhanced equal cost multipath functionality operates to calculate the reduced relative cost if the calculated relative cost is greater than the stored previously identified relative cost.

12. The stacked switch of claim 11, wherein the previously identified relative cost corresponds to the number of stacking links over which the network data ingressing to an ingress switch is forwarded as a result of a hash value calculated on information included in the network data.

13. The stacked switch of claim 11, wherein the calculated relative cost is the number of stacking links over which the network data ingressing to an ingress switch is forwarded as a result of a hash algorithm performed on information included in the network data.

14. The stacked switch of claim 11, wherein the calculated reduced relative cost is calculated by subtracting a maximum value of the previously identified relative cost and a variable from the calculated relative cost.

15. The stacked switch of claim 14, wherein the variable is an integer between zero and N.

16. The stacked switch of claim 11, wherein the network data is transmitted on another egress switch included in the stacked switch with a lower or a higher switch identity if the calculated reduced relative cost corresponds to two egress switches included in the stacked switch and one of the two egress switches does not include an egress port that is a member of the LAG.

17. The stacked switch of claim 16, wherein the lower or the higher switch identity is an assigned identity.

18. The stacked switch of claim 11, wherein the calculated reduced relative cost is modified by incrementing or decrementing the calculated reduced relative cost until an egress switch that includes an egress port that is a member of the LAG is identified.

19. The stacked switch of claim 11, wherein the calculated relative cost is used to identify an egress switch if no egress switches corresponding to the calculated reduced relative cost include an egress port that is a member of the LAG.

\* \* \* \* \*